Sept. 22, 1964   E. T. OAKES ETAL   3,149,584
DETIPPING ROLL FOR ICING
Filed March 13, 1961
FIG.I.
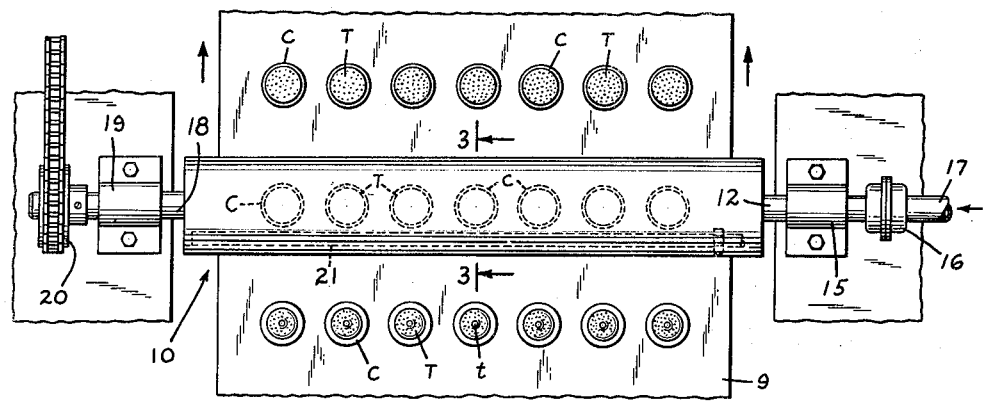
FIG.2.
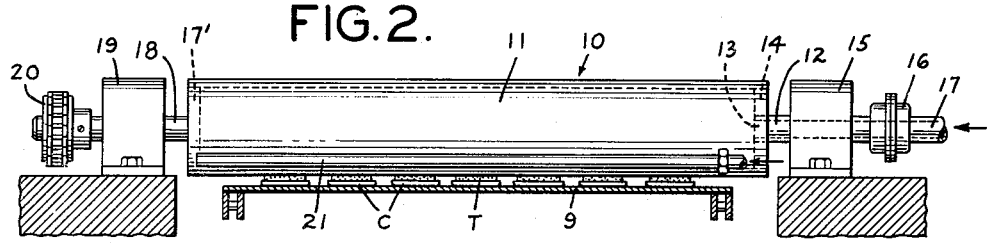
FIG.3.
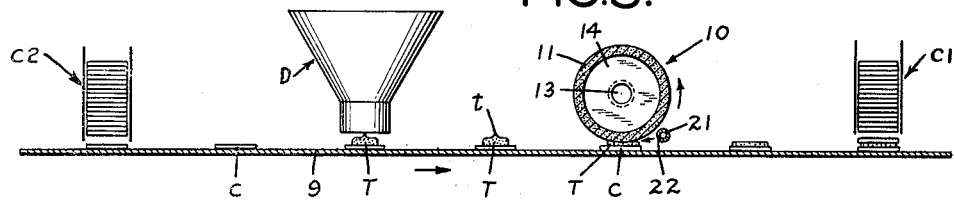
INVENTORS:
EARLE THOMAS OAKES
LOUIS GARTH DOOM
PAUL ALBERT McELLIGOTT
PAUL E. SUNDHEIM
BY
THEIR ATTORNEYS

United States Patent Office 3,149,584
Patented Sept. 22, 1964

3,149,584
DETIPPING ROLL FOR ICING
Earle Thomas Oakes, Islip, Lewis Garth Doom, East Islip, Paul Albert McElligott, Greenlawn, and Paul E. Sandheim, Bayport, N.Y., assignors to The E. T. Oakes Corporation, Islip, N.Y., a corporation of New York
Filed Mar. 13, 1961, Ser. No. 95,242
2 Claims. (Cl. 107—1)

This invention relates to the manufacture of cookies, cakes and the like and it relates, more particularly, to apparatus for flattening, spreading and eliminating the tips left in the cream topping applied by depositing machines to cakes, cookies and similar bakery products.

In the manufacture of cream-filled cookie sandwiches, the depositing apparatus which deposits a selected shape of the topping material onto a cookie also forms an upwardly projecting tip.

In making the cream topped cookie into a sandwich a second cookie must be placed accurately on the topping. In order to register the second cookie the surface of the top must be flat and smooth. Also the topping should be flattened and spread to a uniform diameter so that it is visible between the cookies but does not extend beyond their edges since if it did, it would cause packaging problems. Accordingly, it is necessary to deposit the proper amount of topping on the cookie and then to flatten and spread it uniformly. Cream topping materials usually are composed of between about 23% and 50% fat, the remainder being largely pulverized sugar and flavoring, and consequently they are sticky or adhesive and have a tendency to adhere to anything brought into contact with them. As a result, it has been difficult heretofore to flatten or compress the layers of topping or to flatten the tips projecting therefrom.

In accordance with the present invention, we have provided a detipping apparatus which can compress the cream topping to flatten, spread and detip it without being contaminated or smeared with the topping.

More particularly, in accordance with the present invention we have found that cream toppings will not adhere to a porous member through which gas is forced for the reason that the gas flowing through the member forms a barrier against contact between the member and the topping.

When air is supplied to flow through the porous member, its barrier effect may be enhanced by a jet of air directed against the surface of the roll at the zone where it comes into contact with the topping. The barrier effect is such that pressure may be applied to the topping with the porous member without adhesion of sticking or the topping to the member.

In a typical machine, the porous member may be a hollow roller having its peripheral wall formed of a form-retaining porous material, such as, for example, porous sintered metal, porous ceramic material, porous glass and the like.

For a better understanding of the present invention reference may be had to the accompanying drawings in which:

FIGURE 1 is a plan view of a typical detipping and flattening machine of the type embodying the present invention showing a section of a conveyor carrying rows of cookies through the machine;

FIGURE 2 is a view in front elevation of the machine shown in FIGURE 1; and

FIGURE 3 is a view in section taken on line 3—3 of FIGURE 1 and also showing schematically a depositor and cookie feeders for making cookie sandwiches.

As shown in FIG. 3, rows of cookies C are placed on a conveyor 9 by a cookie feeder or magazine C2 and carried thereby beneath a depositor D of conventional type, where a topping T is applied. As illustrated, the depositor D usually leaves an upstanding tip $t$ on top of the topping T which must be rolled down. The rows of cookies C are carried beneath a detipping roller 10 embodying the present invention and then below a second cookie feeder or magazine C1 where another cookie is placed on the topping T to form a sandwich. The detipping roller 10 includes a hollow cylindrical shell 11 which may be formed of a substantially rigid porous material such as for example, porous sintered metal, a porous ceramic material or the like through which a gas can be forced and diffused. Air is supplied to roller 10 through a quill shaft 12 and an opening 13 in the end disk 14 in the end of the roller. The quill shaft 12 is supported in a pillow block or bearing 15 and is coupled by means of a slip coupling 16 to a pipe 17 by means of which compressed air may be supplied to the interior of the cylinder. The opposite end of the cylinder has a disk-like closure plug 17' carrying a shaft 18 which is supported in a pillow block or bearing 19.

A sprocket 20 or its equivalent is fixed to the end of a shaft 18 to enable the roll to be driven at about the same peripheral speed as the linear speed of the conveyor 9.

As the cookies C are moved beneath the roller 10, the air flowing through the porous cylinder wall 11 forms a thin surface film which precludes adhesion of the topping to the wall of the roller. The pressure of the roller flattens and forces the tips $t$ into the topping T and spreads the topping to a uniform thickness and diameter on the cookie; to enable another cookie to be placed thereon by the feeder C1 to form a cookie sandwich.

If desired, a stream of air may be introduced between the wall 11 of the roller and the topping T from an exterior source, to assist in the formation of an air barrier film. For example, a pipe 21 supplied with compressed air extend parallel with the roller and is provided with a slot 22 extending lengthwise thereof through which a curtain of air is projected against the surface of the roller at about the zone of contact of the roll with the toppings. The air is discharged from the pipe at a low enough velocity to avoid damage to or deformation of the topping.

The size of the roller 10 may be varied to conform to the width of the conveyor and to the space available for receiving the roller. The mechanism by means of which the roller is driven is also susceptible to considerable modification. Accordingly, the form of the invention disclosed herein should be considered as illustrative and not limiting the scope of the following claims.

We claim:

1. A detipping apparatus comprising a conveyor for receiving and transporting cookies having an adherent topping thereon, a hollow member mounted in spaced relation to said conveyor to engage said topping and compress it, said member comprising a wall of porous material for engaging said topping, means for supplying gas to the interior of said member for flow through said porous wall to prevent said topping from adhering to said wall, a conduit extending parallel with said conveyor adjacent to said wall and having an opening therein for directing gas against said wall at the zone of contact between the wall and the topping, and means for supplying gas under pressure to said conduit.

2. A detipping apparatus comprising an endless conveyor for receiving cookies having an adherent topping thereon, a hollow roller having a porous cylindrical wall through which gas can flow, means supporting said roller for rotation in spaced relation to said conveyor; means for driving said conveyor to advance said cookies and engage the toppings thereon with said porous wall, means for supplying gas to said roller for flow through said porous wall to prevent said topping from adhering to said wall and a member extending parallel with said roller for directing a curtain of gas against said roller at the zone of engagement thereof with said topping.

References Cited in the file of this patent

UNITED STATES PATENTS

| | | |
|---|---|---|
| 811,843 | Harris | Feb. 6, 1906 |
| 1,270,725 | Gratton | June 25, 1918 |
| 2,696,793 | Oakes | Dec. 14, 1954 |

FOREIGN PATENTS

| | | |
|---|---|---|
| 747,416 | Great Britain | Apr. 4, 1956 |